Dec. 18, 1923.
J. GALAMB
1,477,751
VEHICLE TOP
Filed Oct. 27, 1920
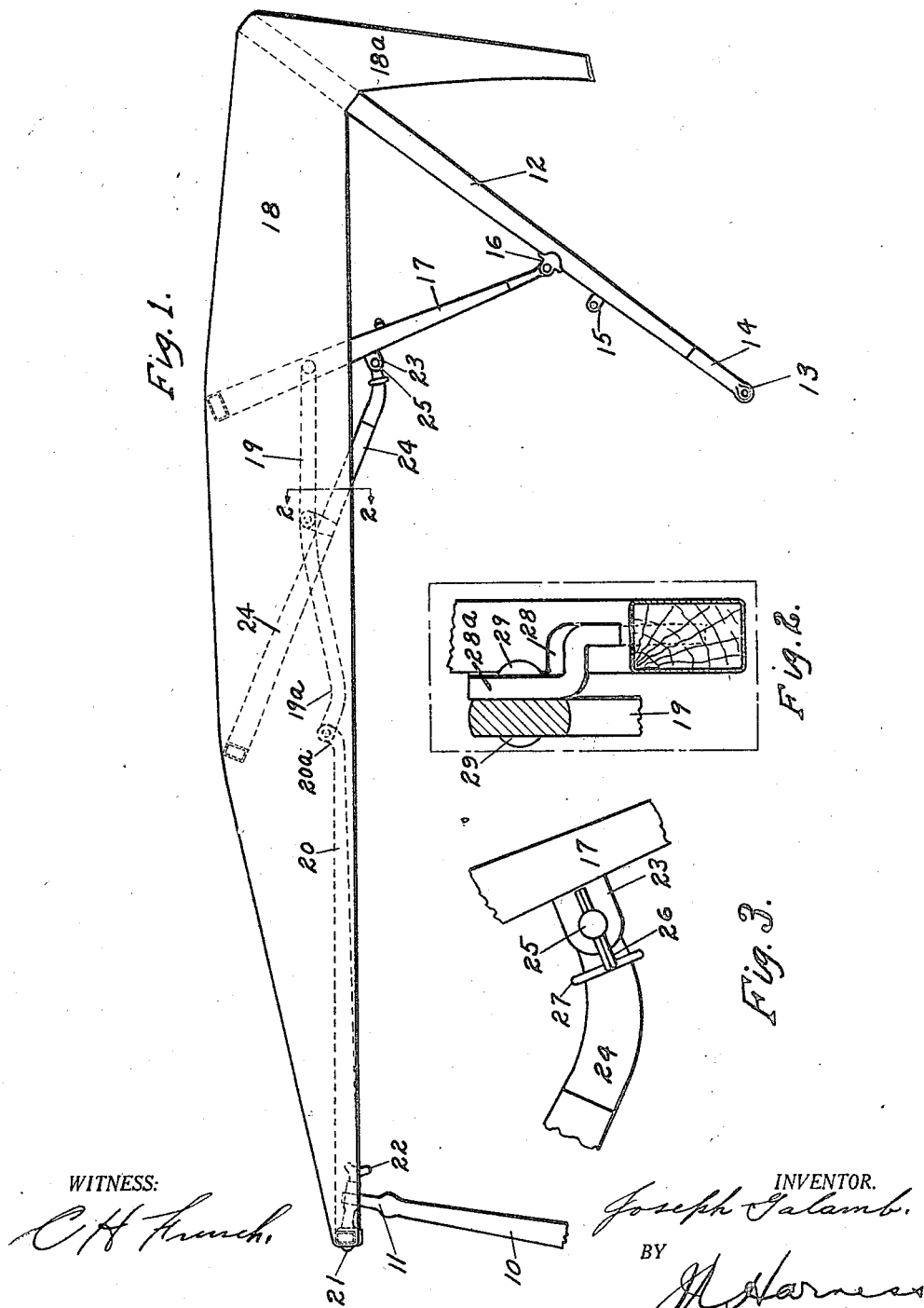
WITNESS:
INVENTOR.
Joseph Galamb.
BY
ATTORNEY.

Patented Dec. 18, 1923.

1,477,751

UNITED STATES PATENT OFFICE.

JOSEPH GALAMB, OF DETROIT, MICHIGAN, ASSIGNOR TO FORD MOTOR COMPANY, OF DETROIT, MICHIGAN, A CORPORATION OF DELAWARE.

VEHICLE TOP.

Application filed October 27, 1920. Serial No. 419,803.

*To all whom it may concern:*

Be it known that I, JOSEPH GALAMB, a citizen of the United States, residing at Detroit, in the county of Wayne and State of Michigan, have invented new and useful Improvements in Vehicle Tops, of which the following is a specification.

The object of my invention is to provide new and useful improvements in vehicle tops of simple, durable and inexpensive construction.

A further object of my invention is to provide a vehicle top having a minimum number of supporting bows for carrying the cover, and in combination with these bows means for allowing the bows to be folded together when the top is collapsed, so that the collapsed top will be neatly folded with a minimum amount of wrinkling of the top material.

A further object of my invention is to provide a top having a rear suporting bow adapted to be inclined upwardly and rearwardly from the body and from a point on the body slightly in the rear of the rear door, so that the balance of the top may be supported either from said rear bow or from the windshield, whereby the supports for the top will occupy a minimum amount of space at the sides of the car.

A further object of my invention is to provide improved means for holding the top and for locking it either in folded or unfolded position.

With these and other objects in view, my invention consists in the arrangement, combination, and construction of the various parts of my improved device, as described in the specification, claimed in my claim, and shown in the accompanying drawings, in which:

Figure 1 is a side view of a top constructed according to my invention.

Figure 2 is a sectional view taken on the line 2—2 of Figure 1, and

Figure 3 is an enlarged, detailed view illustrating the construction of the locking device which holds the top in raised or collapsed position.

Referring to the accompanying drawings, I have used the reference numeral 10 to indicate generally a windshield of ordinary construction which would be mounted upon a vehicle body and which has at its upper end or top a pair of spaced lugs 11 having an opening therethrough. A rear main bow 12 is adapted to be pivoted at 13 to a vehicle body in any ordinary manner and to extend upwardly and rearwardly from that point to a position above the rear end of the body.

Somewhat above the metal socket 14 at the ends of the rear main bow 12 is a lug 15 having an eyelet or opening therethrough and which is placed on the forward surface of each of the arms of the rear main bow 12. Above the lugs 15 are secured spaced ear members 16 adapted to form a pivotal support for rear supporting bow 17. The bow 17 inclines forwardly and upwardly at an angle substantially the same as that of the rear bow 12 and the distance from the ears 16 on both bows to the outer portion of the bows is substantially equal. It will therefore be seen that when the bow 17 is swung on the pivot in the ears 16, then that the sides and outer portion thereof may be made to register with the corresponding portions of the rear main bow 12. The forward swing of the bow 17 is limited by any suitable means, as the cover member 18, and any tendency for the rear main bow 12 to swing forwardly of its position in Figure 1 is limited as by the downwardly extending portion 18ª of the cover, which is fastened to the rear of the vehicle body in any suitable manner.

Pivoted to the upper portion of the side members of the rear supporting bow 17 are a pair of forwardly extending bars 19 which in turn have their forward ends pivotally connected to a bow member 20. The arms 19 and the bow member 20 together form what I will hereafter term an articulated front bow member and carries and distends the front portion of the cover 18. The transverse portion of the front bow member has bolts 21 extended therethrough, which are adapted to register with the holes in the extensions 11 on the windshield 10 and to enter these holes. Wing nuts 22 are provided for the purpose of holding the bolts 21 from displacement within the extensions 11, so that when the top is in its raised position the forward end of the front bow member is held from movement in any direction. It will be noted, however, that the portions adjacent to the pivotal connection between the arms 19 and the bow 20 might sag.

Between the ears 16 and the places where the arms 19 are pivoted to the bow 17 a pair of lugs 23 are fixed to the forward surfaces of the bow 17 in position aligned horizontally with each other. A front supporting bow 24 has outwardly extending pins 25 at its ends adapted to be detachably received in the openings in the lugs 23 and means, such as a cotter pin 26, may be provided to lock the pins 25 into the openings in the lugs 23. In the form of device shown the cotter pin 26 is provided with a ring 27 formed integrally therewith and slidably mounted on the lower portions of the bow 24, thereby making the pins always available.

Intermediate of the ends of the side members of the bow 24 a pair of offset lugs 28 have one end securely fastened into the bow 24 and the other end extended upwardly therefrom. Due to the offsetting of the lug 28 it will be noted that the upwardly extending end 28ª may be pivotally connected by a rivet 29 to the arms 19, thereby allowing the arms 19 to swing freely past the side members of the bow 24 when moved upon the pivot 29. In this connection it will be noted that the arms 19 are pivoted to the inner surfaces of the bow 17 so that these arms may also swing freely past the sides of the side members of the bow 17. The ends of the bow 20 are curved upwardly to the pivot connection with the arms 19 at 20ª.

In the practical operation of my improved top the parts are assembled as is shown in Figure 1, and attached to the car by pivotally connecting the rear bow 12 at 13 to a point just at the rear of the rear door of the car or vehicle. The central portion of the front bow is secured to the wind-shield by running the bolts 21 through the openings in the lugs 11 and then tightening the wing nuts 22. Now if it is desired to collapse the top this is accomplished by removing the bolts 21 from the openings in the lugs 11, which will loosen the forward end of the top from the windshield. The cotter pin 26 is then pulled out of the pin 25 by sliding the collar 27 along the side member of the bow 24. The side members of the bow 24 may then be pulled together to pull out the pins 25 from the lugs 23. This allows the ends of the bow 24 to drop down to position adjacent to the lower part of the rear main bow 12, due to the fact that the forward ends of the arms 19 swing downwardly while the forward end of the bow 24 swings upwardly. The action of these parts being similar to the action in opening a pair of scissors. The forward member 20 of the front bow may be swung upon its pivotal connection with the arms 19 upwardly and to position registering and adjacent to the central or transverse portions of the bows 24, 17 and 12. When the central portions of all these bows are in the position mentioned, then the swinging of the bow 24 on the pivot 29 has brought the ends of the bow 24 to position adjacent to the lugs 15, so that the pins 25 may be pushed through the openings in the lugs 15. If desired the cotter pins 26 may also be pushed into place to lock these pins from movement. When the bows are folded to position adjacent to each other, the rear main bow may be swung back against and held by any suitable rack on the vehicle body, and if desired the bows may all be strapped or otherwise secured in place.

The putting up of the top is similar to the collapsing of the top, except that the operations take place in reverse order. In this connection it will be noted that the bow 24 is made of somewhat resilient material and so shaped that its ends tend to normally, yieldingly assume a position spread apart a distance greater than the distance between the pairs of lugs 15 and 23. Due to this fact the resiliency of the bow will tend to yieldingly hold the pins 25 into the lugs 23 and 15.

Among the many advantages arising from my improved vehicle top it may be specifically pointed out that I have attained a maximum clearance along the sides of the vehicle body with a minimum number of supporting parts and mechanism for operating it. The top may also be very readily collapsed or put up, and the parts may be so standardized that repairs are easily made thereon, if necessary.

Some changes may be made in the arrangement and construction of the various parts of my improved device without departing from the spirit of the invention therein, and it is my intention to cover by my claim such changes as may be reasonably included within the scope thereof.

I claim as my invention:

In an automobile top, the combination with a rear main bow, separated supporting elements disposed thereon at different heights, a rear supporting bow pivoted to the upper supporting element on said main bow and projecting upwardly and outwardly from its point of connection, a pair of parallel forwardly extending bars pivoted to said supporting bow at their rear ends, a front supporting bow pivoted intermediate its ends to said forwardly extending bars, said front supporting bow at its rear end having a detachable connection selectively with the rear supporting bow or the lower supporting element on said rear main bow, and a forward top supporting bow pivoted to the ends of said forwardly extending bars.

JOSEPH GALAMB.

Witness:
E. L. DAVIS.